United States Patent
Allen et al.

(10) Patent No.: US 11,200,498 B2
(45) Date of Patent: *Dec. 14, 2021

(54) ALTERING INPUT SEARCH TERMS

(71) Applicant: International Business Machines Corporation, Armonk, NY (US)

(72) Inventors: Corville O. Allen, Morrisville, NC (US); Malous M. Kossarian, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/795,162

(22) Filed: Oct. 26, 2017

(65) Prior Publication Data

US 2018/0046626 A1    Feb. 15, 2018

Related U.S. Application Data

(63) Continuation of application No. 15/153,576, filed on May 12, 2016.

(51) Int. Cl.
*G06N 5/02*    (2006.01)
*G06F 16/33*   (2019.01)

(52) U.S. Cl.
CPC .......... *G06N 5/02* (2013.01); *G06F 16/3338* (2019.01)

(58) Field of Classification Search
CPC .............................. G06N 5/02; G06F 16/3338
USPC ........................................................ 707/759
See application file for complete search history.

(56) References Cited

U.S. PATENT DOCUMENTS

| | | | | |
|---|---|---|---|---|
| 6,564,213 B1* | 5/2003 | Ortega | ................ | G06F 16/3322 |
| 7,526,425 B2* | 4/2009 | Marchisio | ........... | G06F 16/3338 |
| | | | | 704/9 |
| 8,346,791 B1* | 1/2013 | Shukla | .................. | G06F 16/248 |
| | | | | 707/759 |
| 8,442,973 B2 | 5/2013 | Cramer et al. | | |
| 8,589,399 B1* | 11/2013 | Lee | ........................ | G06F 16/313 |
| | | | | 707/737 |
| 8,645,825 B1* | 2/2014 | Cornea | ................. | G06F 40/232 |
| | | | | 715/257 |
| 8,856,099 B1* | 10/2014 | Lasko | .................... | G06F 16/951 |
| | | | | 707/706 |
| 9,092,485 B2 | 7/2015 | Rubinstein et al. | | |
| 9,355,140 B1* | 5/2016 | Bousquet | ................ | G06F 16/48 |
| 9,448,979 B2 | 9/2016 | Bhogal et al. | | |
| 2003/0212666 A1* | 11/2003 | Basu | .................... | G06F 16/3338 |
| 2005/0289140 A1* | 12/2005 | Ford | ...................... | G06Q 30/02 |
| 2006/0224554 A1* | 10/2006 | Bailey | ................. | G06F 16/3322 |
| 2006/0224565 A1* | 10/2006 | Ashutosh | .............. | G06F 16/951 |
| 2007/0100804 A1* | 5/2007 | Cava | .................... | G06F 16/3322 |

(Continued)

OTHER PUBLICATIONS

Allen et al., U.S. Appl. No. 15/154,576, filed May 12, 2016.

(Continued)

*Primary Examiner* — Evan Aspinwall
(74) *Attorney, Agent, or Firm* — Zilka-Kotab, P.C.

(57) ABSTRACT

In one general embodiment, a computer-implemented method includes identifying an input search term, determining an additional term associated with the input search term, where the additional term targets a predetermined entity, altering the input search term utilizing the determined additional term, and performing a search, utilizing the altered input search term.

7 Claims, 6 Drawing Sheets

(56) References Cited

U.S. PATENT DOCUMENTS

| | | | | |
|---|---|---|---|---|
| 2007/0208733 | A1* | 9/2007 | Brault | G06F 16/90324 |
| 2008/0016040 | A1* | 1/2008 | Jones | G06F 16/3322 |
| 2009/0177463 | A1* | 7/2009 | Gallagher | G06F 16/313 |
| | | | | 704/10 |
| 2009/0234727 | A1* | 9/2009 | Petty | G06Q 30/0256 |
| | | | | 705/14.54 |
| 2012/0047135 | A1* | 2/2012 | Hansson | G06F 16/338 |
| | | | | 707/731 |
| 2012/0109932 | A1 | 5/2012 | Li et al. | |
| 2012/0117101 | A1* | 5/2012 | Unruh | G06F 3/0237 |
| | | | | 707/765 |
| 2012/0159317 | A1* | 6/2012 | Di Cocco | G06F 3/0237 |
| | | | | 715/261 |
| 2012/0296627 | A1* | 11/2012 | Suzuki | G06F 40/237 |
| | | | | 704/2 |
| 2013/0060769 | A1* | 3/2013 | Pereg | G06F 16/3338 |
| | | | | 707/728 |
| 2013/0086094 | A1 | 4/2013 | Lundberg | |
| 2013/0124538 | A1 | 5/2013 | Lee et al. | |
| 2013/0179420 | A1* | 7/2013 | Park | G06F 16/9535 |
| | | | | 707/706 |
| 2014/0164367 | A1* | 6/2014 | Lee | G06F 16/3322 |
| | | | | 707/723 |
| 2014/0207748 | A1 | 7/2014 | Sood et al. | |
| 2014/0258002 | A1* | 9/2014 | Zimmerman | G06Q 30/0256 |
| | | | | 705/14.72 |
| 2014/0282136 | A1* | 9/2014 | Marantz | G06F 16/17 |
| | | | | 715/764 |
| 2015/0154636 | A1* | 6/2015 | Spitkovsky | G06F 16/2291 |
| | | | | 705/14.54 |
| 2015/0269175 | A1* | 9/2015 | Espenshade | G06F 16/90324 |
| | | | | 706/47 |
| 2016/0034458 | A1* | 2/2016 | Choi | G10L 15/06 |
| | | | | 704/251 |
| 2016/0125087 | A1* | 5/2016 | Mallah | G06F 16/90332 |
| | | | | 705/14.54 |
| 2016/0350282 | A1* | 12/2016 | Zhang | G06F 40/14 |
| 2017/0032251 | A1* | 2/2017 | Podgorny | G06Q 30/016 |
| 2017/0316006 | A1* | 11/2017 | Shukla | G06F 16/248 |
| 2017/0329778 | A1 | 11/2017 | Allen et al. | |

OTHER PUBLICATIONS

List of IBM Patents or Patent Applications Treated as Related.
Non-Final Office Action from U.S. Appl. No. 15/153,576, dated Jan. 28, 2019.
Final Office Action from U.S. Appl. No. 15/153,576, dated Aug. 9, 2019.
Non-Final Office Action from U.S. Appl. No. 15/153,576, dated Apr. 6, 2020.
Advisory Action from U.S. Appl. No. 15/153,576, dated Nov. 23, 2020.
Final Office Action from U.S. Appl. No. 15/153,576, dated Sep. 1, 2020.
Advisory Action from U.S. Appl. No. 15/153,576, dated Nov. 18, 2019.
Non-Final Office Action from U.S. Appl. No. 15/153,576, dated May 11, 2021.

* cited by examiner

ALTERING INPUT SEARCH TERMS

BACKGROUND

The present invention relates to textual analysis, and more specifically, this invention relates to determining and implementing alternate search terms.

Search engines are a popular tool for discovering desired information from within large groups of data. However, unaltered search queries do not currently provide any means to direct search results in favor of particular entities, and current advertising in search results can be intrusive and distracting.

SUMMARY

A computer-implemented method according to one embodiment includes identifying an input search term, determining an additional term associated with the input search term, where the additional term targets a predetermined entity, altering the input search term utilizing the determined additional term, and performing a search, utilizing the altered input search term.

Other aspects and embodiments of the present invention will become apparent from the following detailed description, which, when taken in conjunction with the drawings, illustrate by way of example the principles of the invention.

DETAILED DESCRIPTION

Figure 1:
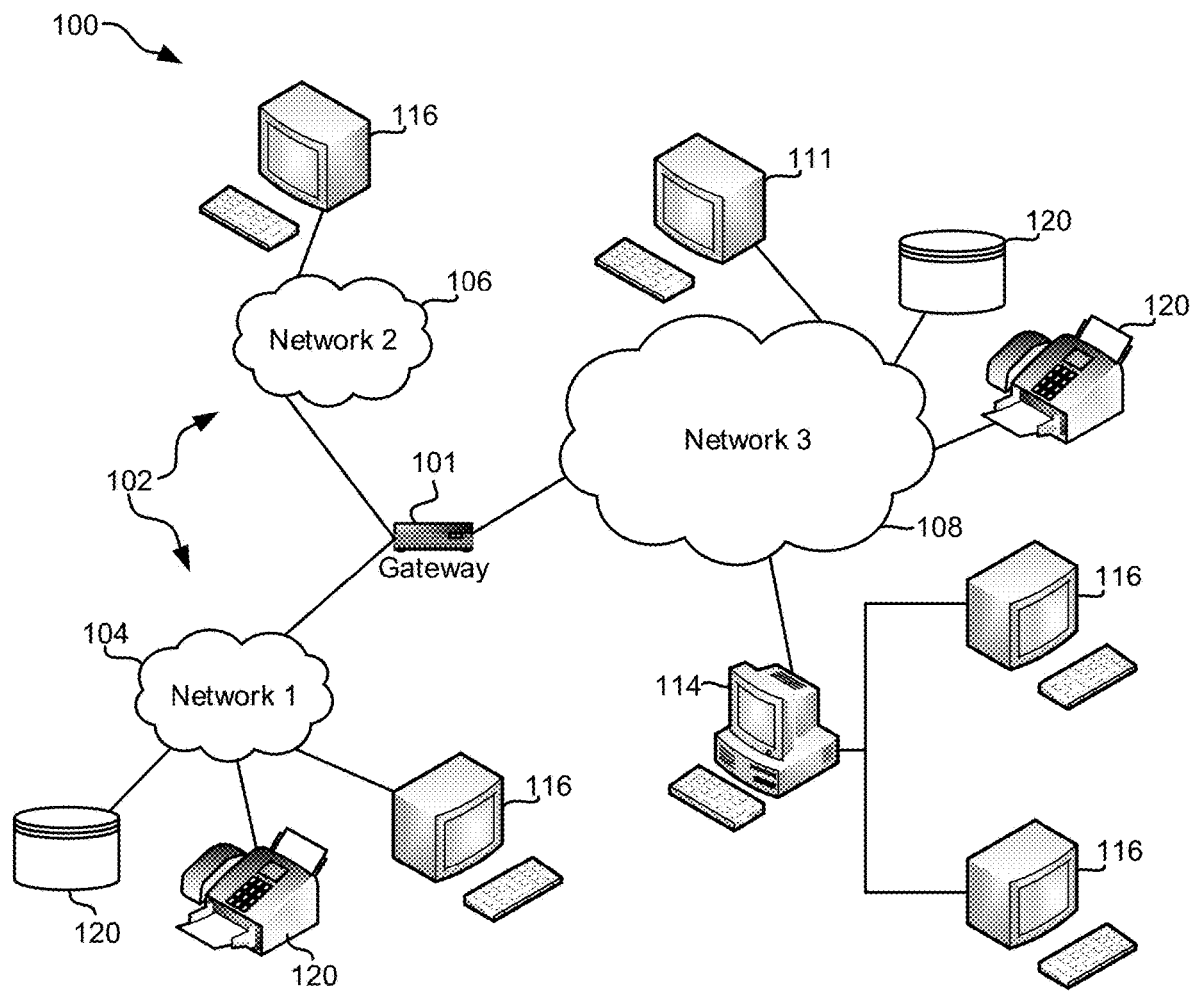
FIG. 1 illustrates a network architecture, in accordance with one embodiment.

The following description discloses several preferred embodiments of systems, methods and computer program products for altering input search terms. Various embodiments provide a method to amend search terms with additional terms that favor a source associated with a predetermined entity.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for altering input search terms.

In one general embodiment, computer-implemented method includes identifying an input search term, determining an additional term associated with the input search term, where the additional term targets a predetermined entity, altering the input search term utilizing the determined additional term, and performing a search, utilizing the altered input search term.

In another general embodiment, a computer program product for altering input search terms comprises a computer readable storage medium having program instructions embodied therewith, wherein the computer readable storage medium is not a transitory signal per se, and where the program instructions are executable by a processor to cause the processor to perform a method comprising identifying an input search term, utilizing the processor, determining, utilizing the processor, an additional term associated with the input search term, where the additional term targets a predetermined entity, altering, utilizing the processor, the input search term utilizing the determined additional term, and performing, utilizing the processor, a search, utilizing the altered input search term.

In another general embodiment, a system includes a processor and logic integrated with and/or executable by the processor, the logic being configured to identify an input search term, determine an additional term associated with the input search term, where the additional term targets a predetermined entity, alter the input search term utilizing the determined additional term, and perform a search, utilizing the altered input search term.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
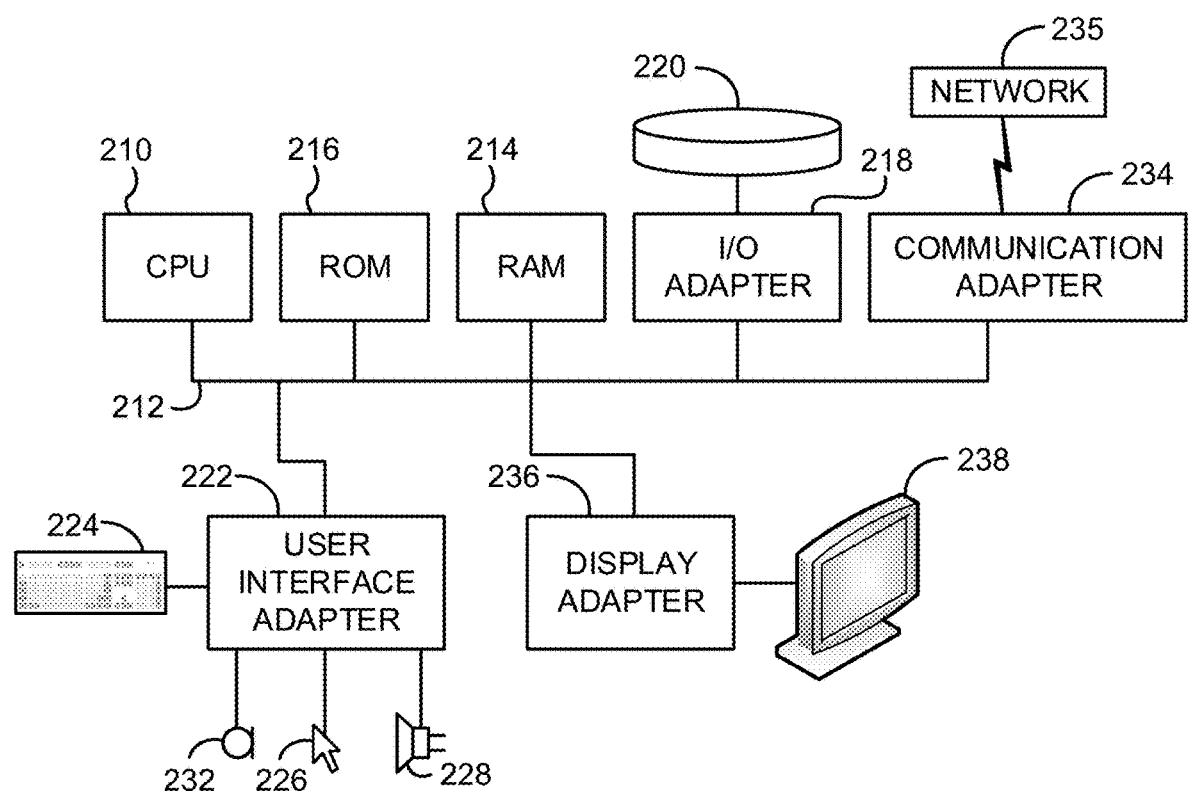
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
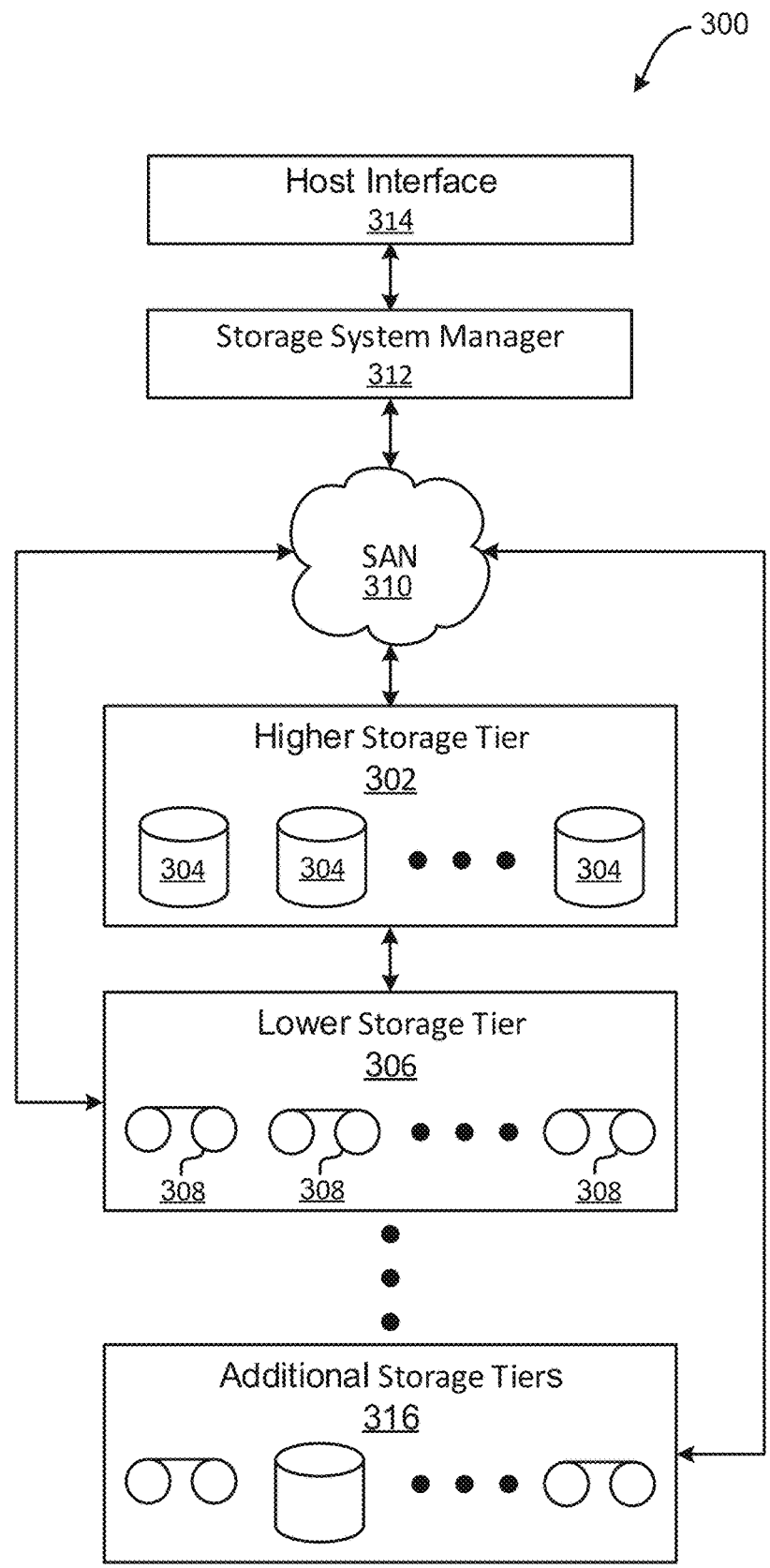
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
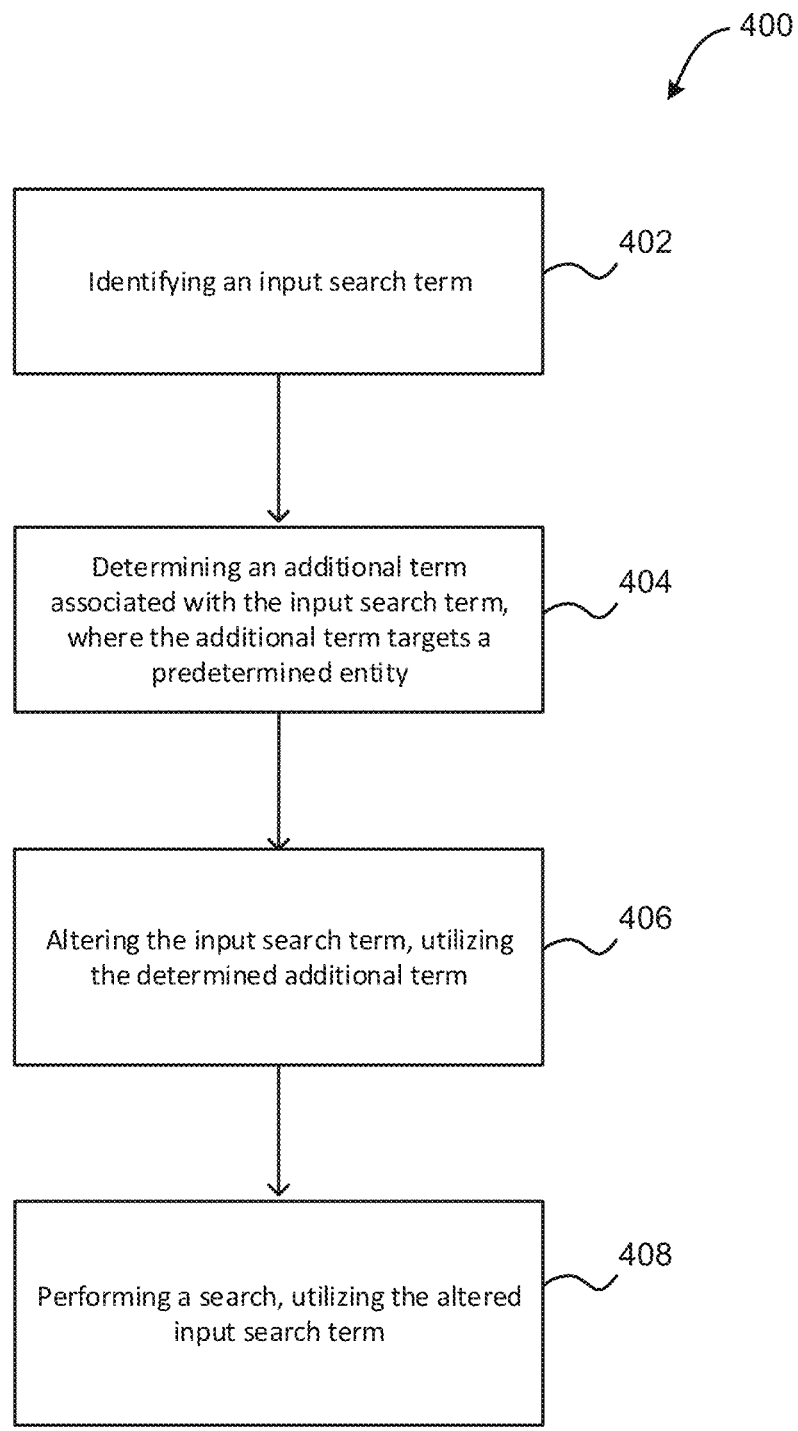
FIG. 4 illustrates a method for altering input search terms, in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an input search term is identified. In one embodiment, the input search term may include alphanumerical text entered by a user. For example, the input search term may include one or more of words, numbers, and symbols entered by the user. In another embodiment, the input search term may be identified at a computing device. For example, the input search term may be identified at a mobile computing device, at a server, at one or more cloud computing devices, at a search engine, etc. In yet another embodiment, the input search term may include an input search term entered by the user. For example, the input search term may include a term to be searched for within one or more groups of data (e.g., one or more databases, one or more groups of objects and/or documents, the Internet, etc.).

Additionally, in one embodiment, the input search term may be identified using one or more prediction methodologies. For example, the user may input a portion of the input search term, and the entirety of the input search term may be predicted based on the input portion. In another embodiment, the input search term may be input by the user into a text box of an interface (e.g., a graphical user interface (GUI), etc.). In yet another embodiment, the input search term may be input by the user using voice input of the user, gesture input of the user, etc.

Further, as shown in FIG. 4, method 400 may proceed with operation 404, where an additional term associated with the input search term is determined, where the additional term targets a predetermined entity. In one embodiment, the additional term may target a source associated with a predetermined entity. For example, the source associated with the predetermined entity may include a web page identified by the entity, created and/or maintained by and/or for the entity, etc. In another embodiment, the source associated with the predetermined entity may include a document specified by the predetermined entity. Of course, however, the source associated with the predetermined entity may include any data for which a predetermined relationship has been established with the predetermined entity.

Further still, in one embodiment, the predetermined entity may include an individual, an organization (e.g., a corporation, a business, etc.), a group of individuals, etc. For example, the predetermined entity may include a customer of a service provider. In another embodiment, the additional term may target the source by giving priority to the source associated with the predetermined entity over other sources associated with other entities.

Also, in one embodiment, the additional term may be selected from one or more terms associated with the input search term. For example, the one or more terms may be stored in a data structure in association with the input search term. In one embodiment, each of the one or more terms associated with the input search term may be determined to be within a domain of the input search term. For example, each of the one or more terms associated with the input search term may be within the scope of the input search term, may be a synonym for the input search term, may include a derivative spelling or construction of the input search term, may be an additional word that expands on the input search term, etc. In another embodiment, a similarity strength may be determined between each of the one or more terms and the input search term, and the similarity strength between each of the one or more terms and the input search term may be greater than a predetermined threshold.

Additionally, in one embodiment, each of the one or more terms may be weighted (e.g., have one or more associated weights, etc.). For example, each of the one or more terms may have a first weight indicating a strength of the term within the source associated with the predetermined entity. In another example, each of the one or more terms may have a first weight that exceeds a predetermined threshold (e.g., indicating that the term is a key term within the source associated with the predetermined entity, etc.).

In another example, each of the one or more terms may have a second weight indicating a strength by which the term targets the source associated with the predetermined entity over other sources, in response to a query (e.g., within the one or more groups of data, etc.) using the term. For instance, the second weight may indicate of level of priority the term gives to the source associated with the predetermined entity (e.g., in search results within the one or more groups of data, etc.) over other sources.

Furthermore, in one embodiment, the additional term may be determined based on one or more weights. For example, the additional term may include a term from the one or more terms associated with the input search term that has the greatest first weight, the greatest second weight, the greatest combined first and second weights, etc. In another embodiment, one of the first and second weights may be given priority over the other. In yet another embodiment, each of the one or more terms may be ranked, listed, etc. based on one or more weights, and the additional term may be selected from the ranking/list (e.g., by selecting a term listed first/ranked first within the list, etc.).

Additionally, in one embodiment, determining the additional term may include identifying a category associated with the input search term. For example, a category associated with the input search term may be determined utilizing a Latent Dirichlet Allocation (LDA) analysis. In another embodiment, determining the additional term may include selecting the additional term in association with the identified category. For example, it may be determined that the additional term is categorized within the identified category, the additional term may be chosen from a list of terms determined by an LDA analysis to be within the identified category, etc. In this way, the identified category may be used to determine whether the additional term is within the domain of the input search term.

Further still, as shown in FIG. 4, method 400 may proceed with operation 406, where the input search term is altered, utilizing the determined additional term. In one embodiment, altering the input search term may include augmenting the input search term by changing one or more letters within the input search term. For example, altering the input search term may include changing a spelling of the input search term from the input search term to the determined additional term. In another embodiment, altering the input search term may include substituting the determined additional term for the input search term and including an identified category for the terms as a sub search term. For example, the additional term may be suggested to the user who input the term as a substitute for the input search term. In another example, if the user selects the additional term as a substitute for the input search term, the additional term may replace the input search term (e.g., within a text input box of a GUI, etc.).

Also, in one embodiment, altering the input search term may include expanding the input search term utilizing the additional term. For example, the additional term may be added before or after the input search term (or suggested to the user as an addition before or after the input search term). In another embodiment, the input search term may be altered automatically. For example, the input search term may be altered by performing an autofill action within a text input box of a GUI.

Furthermore, as shown in FIG. 4, method 400 may proceed with operation 408, where a search is performed, utilizing the altered input search term. In one embodiment, performing the search may include searching one or more groups of data (e.g., one or more databases, one or more groups of objects and/or documents, the Internet, etc.), utilizing the altered input search term. In another embodiment, performing the search may include returning a plurality of sources as search results to the user. In yet another embodiment, the source associated with the predetermined entity may be listed above/instead of other sources associated with other entities due to the altered input search term. For example, the source associated with the predetermined entity may be ranked higher in search results for the altered input search term when compared to search results for the unaltered input search term.

In this way, the source associated with a predetermined entity may be prioritized over other sources by altering input search terms to include one or more relevant terms that are more favorable toward the source associated with the predetermined entity during searching. Additionally, search results may be altered without redirecting or reorganizing search results after a search has been performed, which may save necessary processing to be performed by a device (e.g., a search engine, etc.) and may therefore improve the efficiency of the device, reduce an amount of power consumed by the device, etc.

Figure 5:
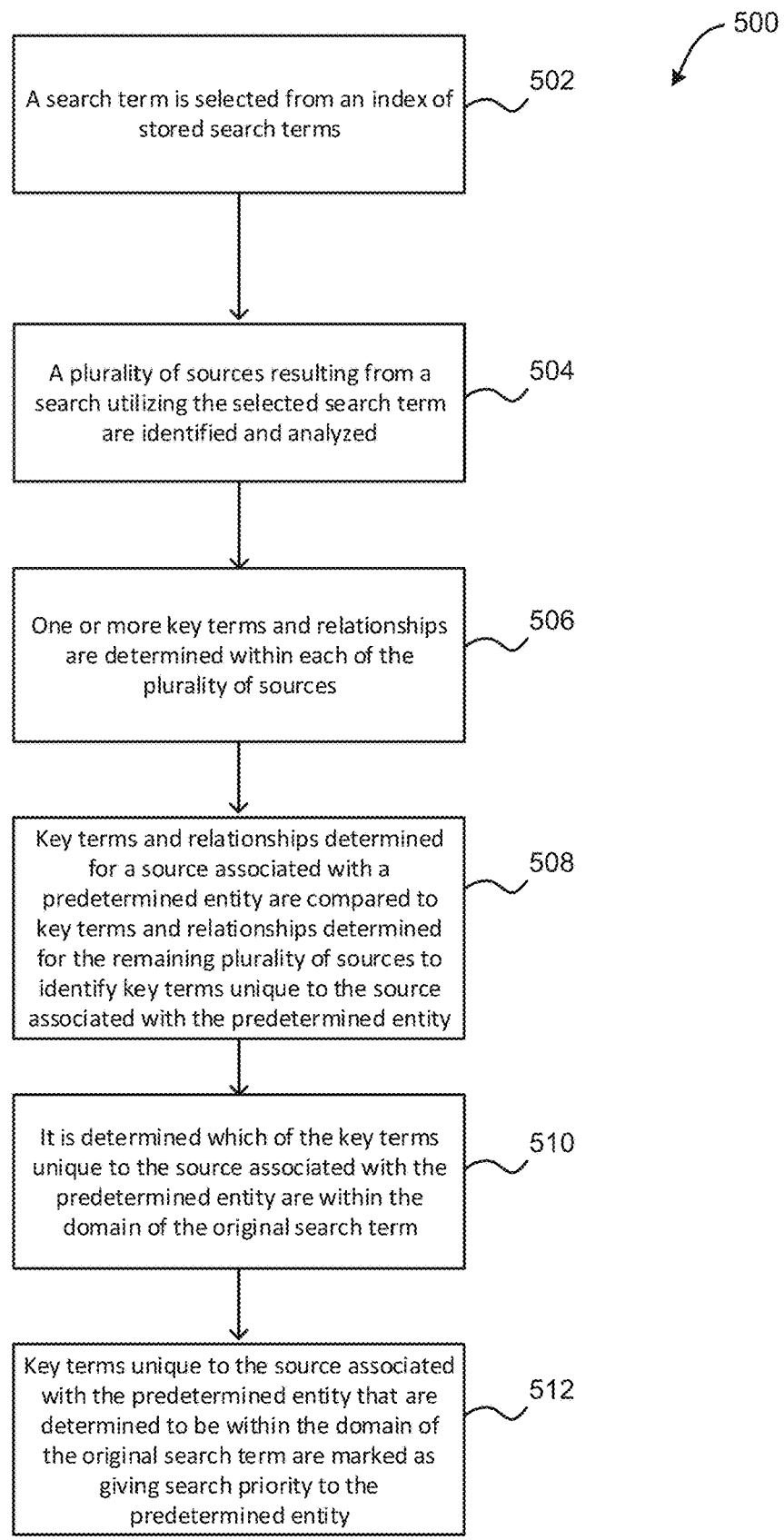
FIG. 5 illustrates a method for creating a key term database, in accordance with one embodiment.

Now referring to FIG. 5, a flowchart of a method 500 for creating a key term database is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a search term is selected from an index of stored search terms. In one embodiment, the index may include a plurality of search terms that each result in one or more sources (e.g., documents, web sites, etc.). In another embodiment, the index of search terms may be created by performing one or more of crawling indexing sources (e.g., by performing web crawling, etc.). In yet another embodiment, one or more of the sources may include a source associated with a predetermined entity (e.g., a client paying for a predetermined service, etc.).

Additionally, method 500 may proceed with operation 504, where a plurality of sources resulting from a search utilizing the selected search term are identified and analyzed. In one embodiment, analyzing the sources may include performing an analysis of content found within the sources. For example, if a source is a web site, analyzing the source may include analyzing textual content within the web site.

Further, method 500 may proceed with operation 506, where one or more key terms and relationships are determined within each of the plurality of sources. In one embodiment, the key terms may include one or more words, and the key relationships may include one or more word relationships. For example, for each source, a plurality of terms and relationships within the source may be scored, ranked, weighted, etc. based on one or more of location, frequency, etc. In another example, if the score for a term or relationship within the source is over a predetermined score, then the term or relationship may be considered a key term or relationship for the source. In another embodiment, all key terms and relationships determined for a source may be matched to the source (e.g., linked, etc.).

Further still, method 500 may proceed with operation 508, where key terms and relationships determined for a source associated with a predetermined entity are compared to key terms and relationships determined for the remaining plurality of sources to identify key terms unique to the source associated with the predetermined entity. In one embodiment, the comparison may identify one or more key terms that are matched to the source associated with the predetermined entity but are not matched to other sources resulting from the search utilizing the selected search term.

Also, method 500 may proceed with operation 510, where it is determined which of the key terms unique to the source associated with the predetermined entity are within the domain of the original search term. In one embodiment, it may be determined which of the unique key terms are within the scope of the original search term. For example, it may be determined which of the unique key terms can act as a synonym for the original search term. In another example, it may be determined which of the unique key terms comprise a derivative spelling or construction of the original search term. In yet another example, it may be determined which of the unique key terms expand on the original search term.

In addition, method 500 may proceed with operation 512, where key terms unique to the source associated with the predetermined entity that are determined to be within the domain of the original search term are marked as giving search priority to the predetermined entity. In one embodiment, marking the key terms may include flagging each of the key terms. In another embodiment, marking the key terms may include assigning a weight to each of the key terms based on one or more factors (e.g., one or more previously calculated scores, a ranking that the source achieves as a result of a search using the key term, etc.).

In yet another embodiment, marking the key terms may include ranking each of the key terms based on one or more factors. In still another embodiment, these unique key terms may be stored in association with the selected search term and/or an identifier of the predetermined entity. For example, metadata identifying the selected search term as well as the predetermined entity may be stored with the unique key terms in a data structure (e.g., a database, cloud storage, etc.).

In this way, search terms within a data structure may be linked to unique weighted key terms that may, when incorporated into a search query in addition to or instead of the search term, give priority to and/or target the source associated with the predetermined entity. In one embodiment, the unique weighted key terms may have a first weight associated with a strength within the source and may have a second weight associated with a priority given to the source associated with the predetermined entity over other sources.

Additionally, in one embodiment, the unique weighted key term with strongest combined first and second weights may be selected to alter the search term when the search term is input by a user. In another embodiment, one of the first and second weights may be prioritized during selection. In yet another embodiment, a search may be performed with the altered search term, and the results of the search may have the source associated with the predetermined entity listed before additional sources (e.g., ranking the source associated with the predetermined entity higher in search results, etc.). In still another embodiment, a search may be performed with the altered search term, and the results of the search may have the source associated with the predetermined entity listed instead of additional sources that would have been listed as search results for the original search term.

Figure 6:
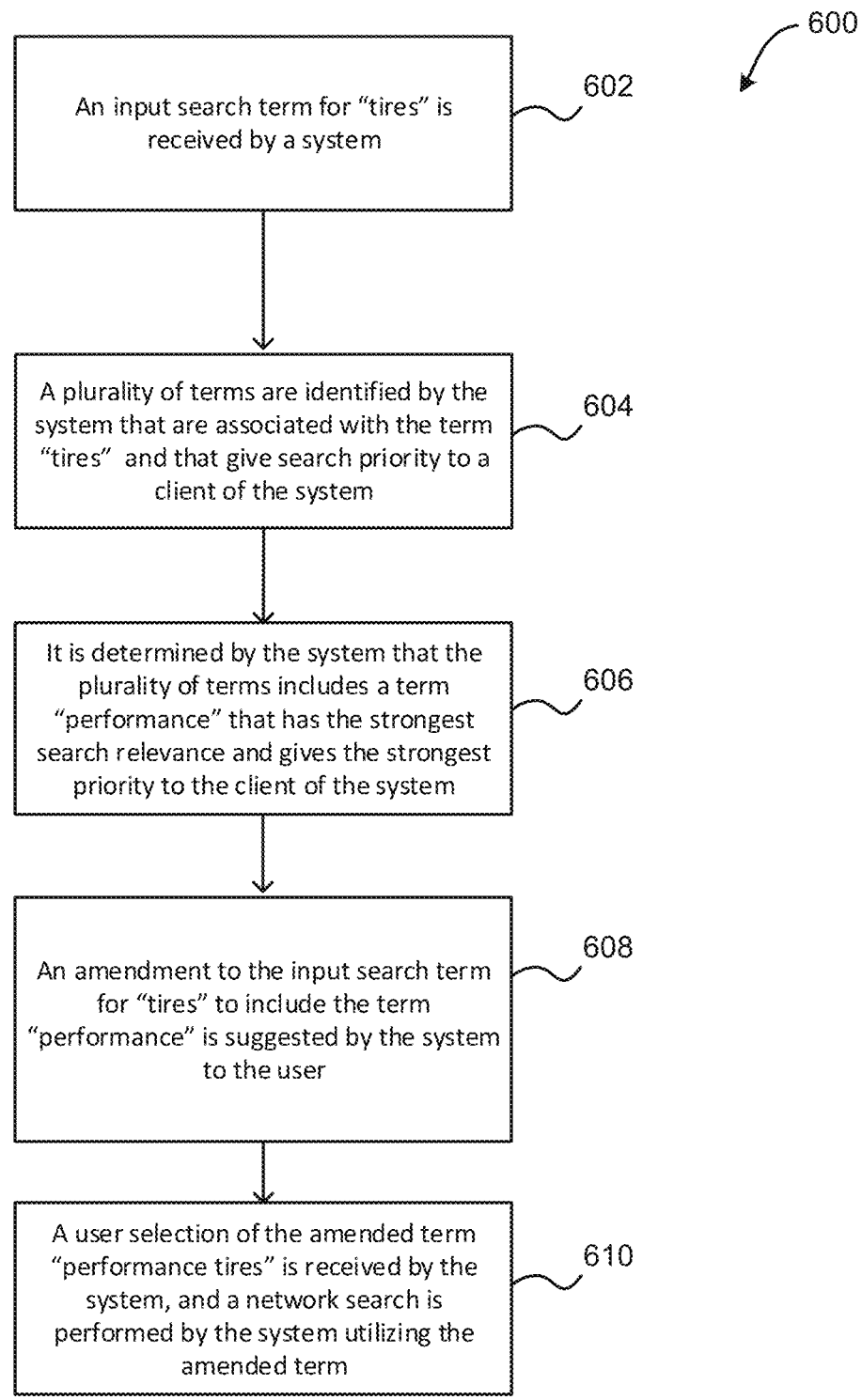
FIG. 6 illustrates a method for amending a search term, in accordance with one embodiment.

Now referring to FIG. 6, a flowchart of a method 600 for amending a search term is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where an input search term for "tires" is received by a system. In one embodiment, the search term may be input by a user entering the term "tires" into a field of a graphical user interface provided by the system. In another embodiment, the user may submit such search term as part of a request to search a network (e.g., the Internet, etc.) using the submitted term.

Additionally, method 600 may proceed with operation 604, where a plurality of terms are identified by the system that are associated with the term "tires" and that give search priority to a client of the system. In one embodiment, the plurality of terms may be stored in a database of the system as terms that are determined to be within the domain of the original search term "tires." In another embodiment, the client of the system may include a customer of the system that pays the system a predetermined amount in exchange for services associated with conducting network searches.

Further, method 600 may proceed with operation 606, where it is determined by the system that the plurality of terms includes a term "performance" that has the strongest search relevance and gives the strongest priority to the client of the system. For example, using a weighted ranking system that accounts for both term relevance and client prioritization, it may be determined that adding the term "performance" to the search term "tires" results in search results where one or more web sites associated with the client are ranked higher in search results than web sites associated with competitors of the client. For instance, a web site associated with the client may specialize in performance tires, whereas websites associated with competitors of the client may not carry performance tires.

Further still, method 600 may proceed with operation 608, where an amendment to the input search term for "tires" to include the term "performance" is suggested by the system to the user. In one embodiment, the term "performance tires" may be suggested to the user as a replacement for the term "tires" (e.g., utilizing a drop-down box, etc.). In another embodiment, the term "performance tires" may be automatically substituted for the term "tires" (e.g., utilizing form autocomplete functionality, etc.).

Also, method 600 may proceed with operation 610, where a user selection of the amended term "performance tires" is received by the system, and a network search is performed by the system utilizing the amended term. In one embodiment, results of the search may be provided to the user, where the results include a ranking of web pages that favor web pages associated with the client over web pages associated with competitors of the client.

In this way, an input search term may be amended with one or more terms that are within the domain of the input search term and that target search results that favor a client of a system performing the search.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   creating a key term database by:
   selecting an input search term from an index of stored search terms,
   identifying and analyzing a plurality of sources of content resulting from a search utilizing the selected input search term,
   determining one or more key terms and relationships within each of the plurality of sources of content,
   comparing the one or more key terms and relationships determined for the source of content associated with a predetermined entity to key terms and relationships determined for a remaining plurality of sources to identify key terms unique to the source associated with the predetermined entity,
   determining a plurality of key terms unique to the source associated with the predetermined entity that are within a domain of the selected input search term, and
   storing the plurality of key terms unique to the source associated with the predetermined entity that are determined to be within the domain of the selected input search term in association with the input search term in the key term database;
   identifying the input search term;
   identifying the predetermined entity for which search priority is to be given;
   determining a web page associated with the predetermined entity;
   identifying, from the key term database, the plurality of key terms stored in association with the input search term, where each of the plurality of key terms have a determined similarity strength to the input search term that is greater than a predetermined threshold;
   for each of the plurality of key terms, determining a first weight value indicating a strength of the key term within the web page, as well as a second weight value indicating a level of priority the key term gives the web page over other web pages in search results in response to a query;
   selecting as an additional term one of the plurality of key terms having the greatest combined first weight value and second weight value;
   altering the input search term utilizing the selected additional term; and
   performing a search, utilizing the altered input search term.

2. The computer-implemented method of claim 1, wherein a user inputs a portion of the input search term, and an entirety of the input search term is predicted based on the selected additional term.

3. The computer-implemented method of claim 1, wherein the web page associated with the predetermined entity includes a web page created by and maintained for the predetermined entity.

4. The computer-implemented method of claim 1, further comprising:
   determining a category associated with the input search term, utilizing a Latent Dirichlet Allocation (LDA) analysis;
   wherein the plurality of key terms are categorized within the determined category.

5. The computer-implemented method of claim 1, wherein storing the plurality of key terms unique to the source associated with the predetermined entity that are determined to be within the domain of the selected input search term in association with the input search term in the key term database includes storing metadata identifying the selected input search term and metadata identifying the predetermined entity with the plurality of key terms in the key term database.

6. The computer-implemented method of claim 1, wherein altering the input search term includes substituting the selected additional term for the input search term and including an identified category for the input search term as a sub search term.

7. The computer-implemented method of claim 1, wherein the web page associated with the predetermined entity is ranked higher in search results for the altered input search term when compared to search results for the input search term.

* * * * *